(12) United States Patent
Arav

(10) Patent No.: US 7,529,795 B2
(45) Date of Patent: May 5, 2009

(54) MESSAGE BOARD AGGREGATOR

(75) Inventor: Gal Arav, Bedford, MA (US)

(73) Assignee: Stragent, LLC, Longview, TX (US)

( * ) Notice: Subject to any disclaimer, the term of this patent is extended or adjusted under 35 U.S.C. 154(b) by 225 days.

(21) Appl. No.: 11/384,957

(22) Filed: Mar. 20, 2006

(65) Prior Publication Data

US 2006/0155809 A1 Jul. 13, 2006

(51) Int. Cl.
G06F 15/16 (2006.01)
G06F 3/00 (2006.01)

(52) U.S. Cl. .................. 709/204; 715/758

(58) Field of Classification Search ............ None
See application file for complete search history.

(56) References Cited

U.S. PATENT DOCUMENTS

| | | | |
|---|---|---|---|
| 5,754,176 A | 5/1998 | Crawford | |
| 5,854,630 A | 12/1998 | Nielson | |
| 6,216,141 B1 | 4/2001 | Straub et al. | |
| 6,336,133 B1 * | 1/2002 | Morris et al. | 709/204 |
| 6,405,238 B1 | 6/2002 | Votipka | |
| 6,456,303 B1 | 9/2002 | Walden et al. | |
| 6,498,835 B1 | 12/2002 | Skladman et al. | |
| 6,661,877 B1 | 12/2003 | Lee et al. | |
| 6,748,449 B1 | 6/2004 | Dutta | |
| 2002/0130895 A1 | 9/2002 | Brandt et al. | |
| 2002/0152238 A1 | 10/2002 | Hayes | |
| 2003/0115306 A1 * | 6/2003 | Hagarty et al. | 709/223 |
| 2004/0172405 A1 * | 9/2004 | Farran | 707/100 |
| 2005/0076110 A1 | 4/2005 | Mathew et al. | |
| 2006/0015821 A1 | 1/2006 | Jacques Parker et al. | |
| 2006/0064342 A1 * | 3/2006 | Frengut et al. | 705/10 |
| 2006/0174340 A1 * | 8/2006 | Santos et al. | 726/21 |

FOREIGN PATENT DOCUMENTS

| | | |
|---|---|---|
| WO | WO 02/03243 A1 | 1/2002 |
| WO | WO 02/061610 A1 | 8/2002 |
| WO | WO 2004/029780 A2 | 8/2004 |

OTHER PUBLICATIONS

BoardCentral Website (Feb. 15, 2006).
StockHouse Website (Feb. 15, 2006).
ClearStation Website (Feb. 15, 2006).
FreeRealTime Message Boards Website (Feb. 15, 2006).
MarketWatch Message Boards Website (Feb. 15, 2006).
The Motley Fool Discussion Boards Website (Feb. 15, 2006).

(Continued)

*Primary Examiner*—Patrice Winder
*Assistant Examiner*—Minh-Chau Nguyen

(57) ABSTRACT

Web content representing a first message is displayed in a window of a computer program. The first message is one of a plurality of messages posted to an online forum. A plurality of message summaries are displayed in the same window of the computer program, contemporaneously with the first message. The plurality of message summaries include first information derived from the first message and second information derived from a second message in the plurality of messages. The web content representing the first message may, for example, be displayed in a first frame of the window and the information derived from the first message may be displayed in a second frame of the same window. The online forum may, for example, be a web-based financial message board.

66 Claims, 3 Drawing Sheets

OTHER PUBLICATIONS

MSN Money Message Boards Website (Feb. 15, 2006).
Yahoo! Message Boards Website (Feb. 15, 2006).
StockSelector.com Message Boards Website (Feb. 15, 2006).
SmallCapCenter.com Message Boards Website (Feb. 15, 2006).
Silicon Investor Message Boards Website (Feb. 15, 2006).
RagingBull Website (Feb. 15, 2006).
WallStreetTape.com Website Feb. 15, 2006.
InvestorVillage Website (Feb. 17, 2006).
Forex Trading Website (Feb. 17, 2006).
Elite Trader.com as viewed on Mar. 21, 2007.
AllStocks.com as viewed on Mar. 21, 2007.
InvestorsHub.com as viewed on Mar. 21, 2007.
TheLion.com as viewed on Mar. 21, 2007.
Finance.Google.com as viewed on Mar. 21, 2007.
ADVFN.com as viewed on Mar. 21, 2007.
EquityGroups.com as viewed on Mar. 21, 2007.
StockPickr.com as viewed on Mar. 21, 2007.
StockTickr.com as viewed on Mar. 21, 2007.
SocialPicks.com as viewed on Mar. 21, 2007.
FeedTheBull.com as viewed on Mar. 21, 2007.
Bullpoo.com as viewed on Mar. 21, 2007.
Wallstrip.com as viewed on Mar. 21, 2007.
Monitor110.com as viewed on Mar. 21, 2007.
CollectiveIntellect.com as viewed on Mar. 21, 2007.

* cited by examiner

MESSAGE BOARD AGGREGATOR

CROSS REFERENCE TO RELATED APPLICATIONS

This application is related to a commonly-owned and concurrently-filed U.S. Provisional Patent Application entitled, "Instantaneous Symbol Lookup," and a commonly-owned and concurrently-filed U.S. Provisional Patent Application entitled "Hyperlink with Graphical Cue," both of which are hereby incorporated by reference.

BACKGROUND

1. Field of the Invention

The present invention relates to aggregation of electronic messages and, more particularly, to aggregation of messages posted to online financial message boards.

2. Related Art

People have long used computer networks to communicate with each other in a variety of ways. Email, for example, enables both one-to-one and one-to-many communication in a way that is analogous to traditional written communications delivered by postal mail. Email became the dominant form of personal communication in the early years of the Internet, perhaps because it is easy to learn how to use and does not require high bandwidth networks or powerful computers to implement.

Email, however, has drawbacks. It is not, for example, useful for many-to-many communications, or for archiving communications for subsequent viewing over the network by those other than the original sender and recipient. Early forms of network communication that addressed these problems were electronic bulletin board systems (BBSs) and newsgroups. Such systems allowed users to post messages on particular topics, and for other users to view messages posted on each topics. Newsgroups remain a popular way for people to engage in conversation and find information on particular topics of interest to them.

Such systems, however, have their own drawbacks. For example, newsgroup postings typically are limited to text, or to text with an attached binary file. Newsgroups, in other words, do not provide users with the rich graphical experience they have come to expect from content on the World Wide Web. Similarly, newsgroup user interfaces typically display only a list of messages in each newsgroup, and do not provide additional graphical content that could be used to enhance the user's experience and/or to display advertisements or otherwise generate revenue for the provider of the newsgroup user interface.

At least in part in response to these problems, web sites have been made available which enable users to access email, newsgroups, and other forms of online communication through a web browser. Such web sites typically provide a graphical user interface through which users may write, post, read, and delete messages. Such web sites may also display advertisements or otherwise employ mechanisms that generate revenue for the provider of the graphical user interface. This approach attempts to create a win-win situation for the web site user and provider, by providing the user with powerful communications features and a rich graphical experience, and providing the web site provider with the ability to generate profit from the value it adds to the user's experience.

A newsgroup is one of many kinds of online message boards. One particularly popular kind of online message board is the financial message board, which is used to exchange information about company stock prices and other financial information. Frequent users of financial message boards require highly current and accurate information, due to the speed at which financial information changes and the consequences of making financial decisions based on inaccurate information. To obtain as much accurate information as quickly as possible, such users may scan multiple message boards for messages about a single stock. For example, financial message board users often refer to relevant information about a company hosted on multiple financial portal web sites, such as the company profile, stock charts, competitors, SEC filings, analyst opinions, news, upcoming events, trades made by officers, and other users' rumors. Furthermore, a single user may track a large number of stocks at the same time, while also keeping track of broader economic trends such as fluctuations in interest rates and currency exchange rates.

The unique needs of financial message board users, therefore, create special challenges for those seeking to design user interfaces for such message boards. For example, it is critical to provide the user with all of the information he desires, but within the constraints of the available display screen and network bandwidth, and without providing the user with so much information at once that he becomes overloaded.

Financial message boards also provide a unique opportunity for web site providers. Heavy users of financial message boards tend to be affluent, well-educated, and Internet-savvy. They also tend to be frequent purchasers of financial products and services, and to purchase such products and services over the Internet. Financial message board users, therefore, represent an attractive market to web advertisers. Web sites that provide access to financial message boards using features that attract large numbers of repeat users would therefore likely be capable of generating significant advertising revenue.

SUMMARY

Web content representing a first message is displayed in a window of a computer program. The first message is one of a plurality of messages posted to an online forum. A plurality of message summaries are displayed in the same window of the computer program, contemporaneously with the first message. The plurality of message summaries include first information derived from the first message and second information derived from a second message in the plurality of messages. The web content representing the first message may, for example, be displayed in a first frame of the window and the information derived from the first message may be displayed in a second frame of the same window. The online forum may, for example, be a web-based financial message board. For example, one aspect of the present invention is directed to a computer-implemented method including: (1) displaying, in a window of a computer program, web content representing a first message, the first message comprising one of a plurality of messages posted to a first online forum; and (2) displaying, in the window of the computer program and contemporaneously with (1), a plurality of message summaries, the plurality of message summaries comprising first information derived from the first message and second information derived from a second message in the plurality of messages.

Another aspect of the present invention is directed to a computer-implemented method including: (1) receiving, over a network, first information comprising a plurality of message data units, wherein each of the plurality of message data units contains information derived from a corresponding one of a plurality of messages posted to an online forum; (2) displaying, in a first frame of a window of a computer program, web content representing a first one of the plurality of messages;

and (3) displaying, in a second frame of the window distinct from the first frame and contemporaneously with (2), a plurality of message summaries corresponding to the plurality of messages, wherein each of the plurality of message summaries consists of a subset of information in a corresponding one of the plurality of message data units.

Yet another aspect of the present invention is directed to a computer-implemented method including: (1) displaying, in a window of a computer program, web content representing a first message, the first message comprising one of a plurality of messages posted to a first online forum; (2) displaying, in the window of the computer program and contemporaneously with (1), a message summary, the message summary comprising first information derived from the first message; (3) receiving, from a user, input selecting the message summary; and (4) displaying third information derived from the first-message, in response to receiving the user input.

DETAILED DESCRIPTION

Figure 1:
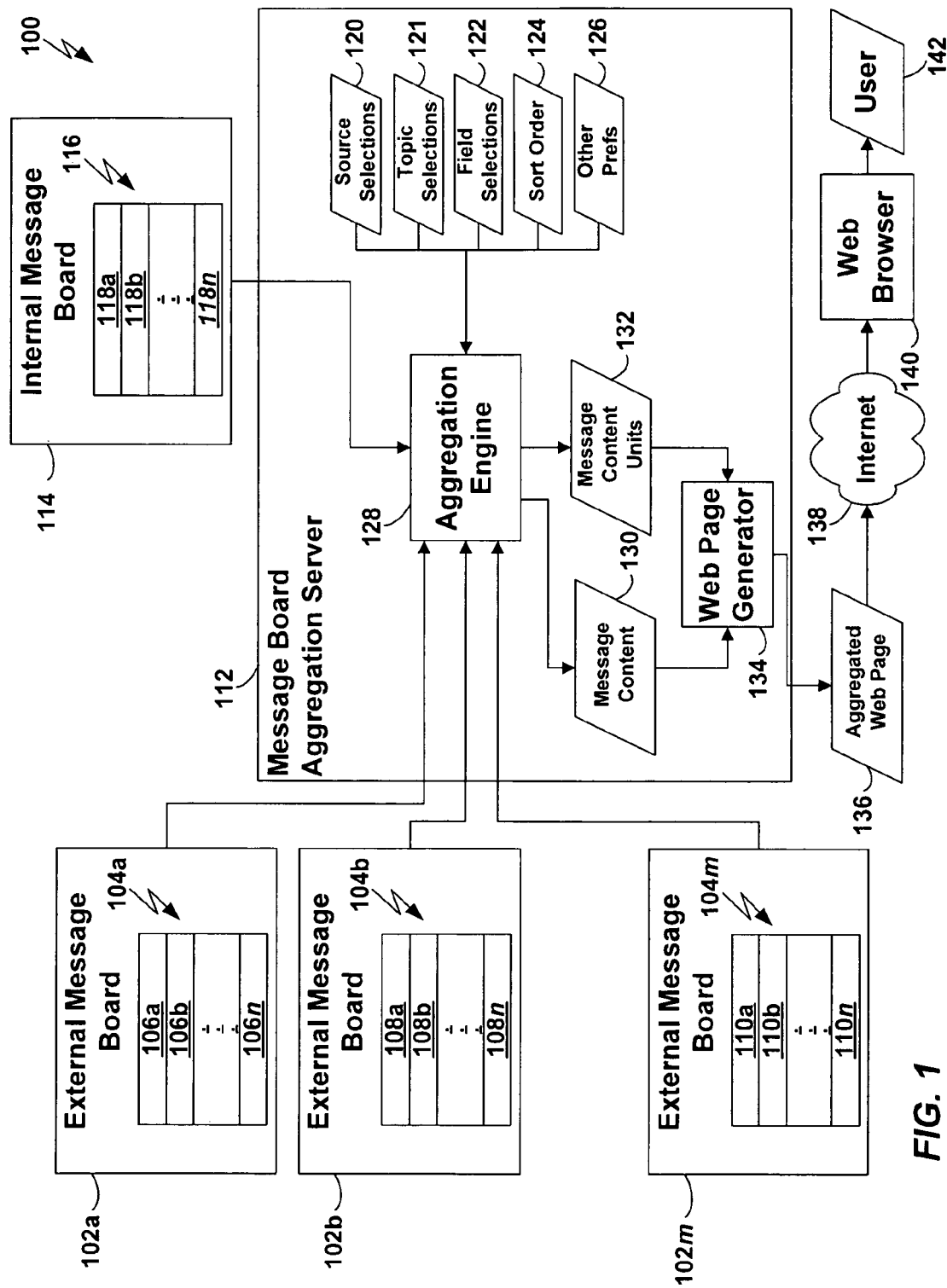
FIG. 1 is a dataflow diagram of a message board aggregation system according to one embodiment of the present invention.
Figure 2:
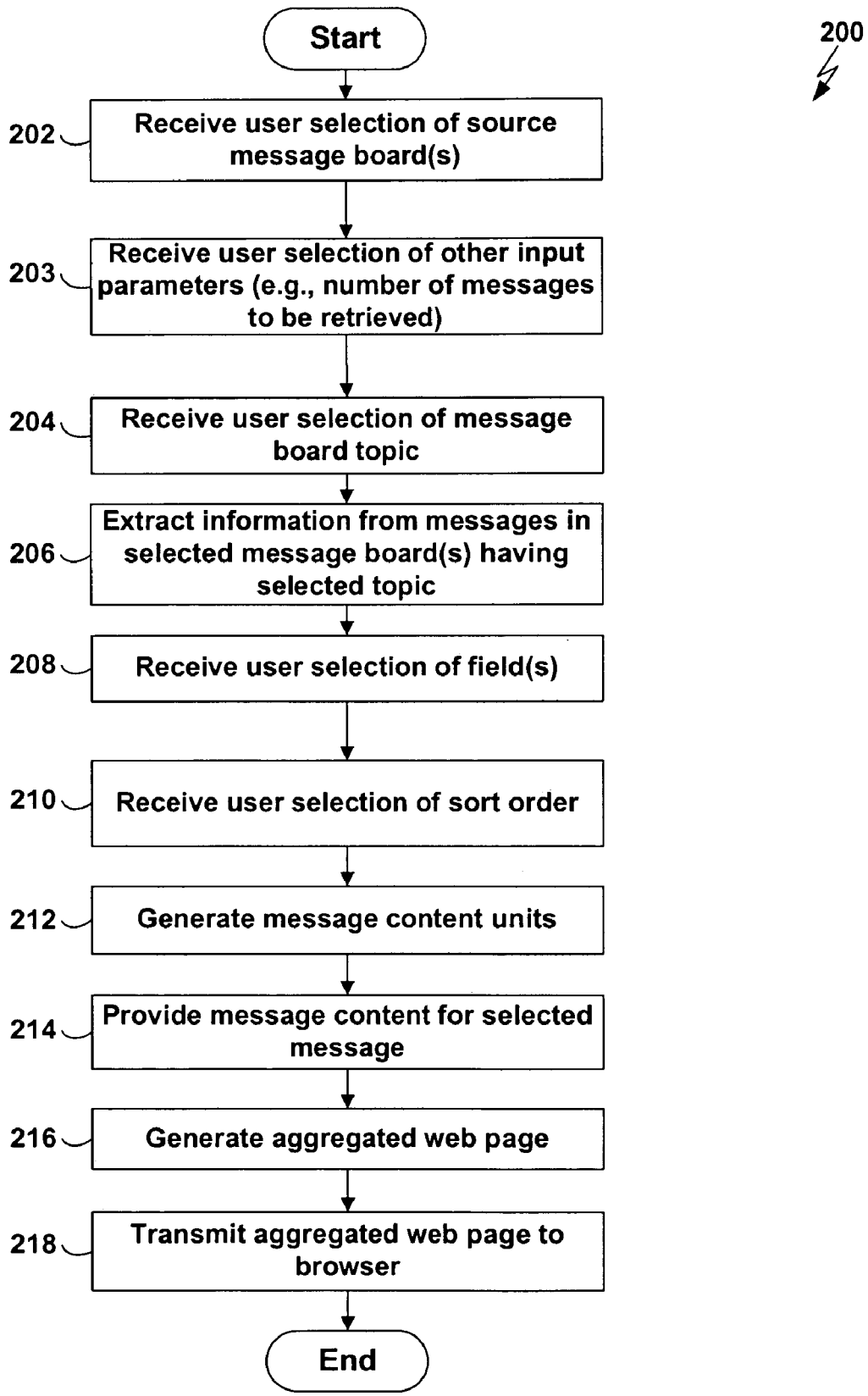
FIG. 2 is a flowchart of a method performed by the system of FIG. 1 according to one embodiment of the present invention.
Figure 3:
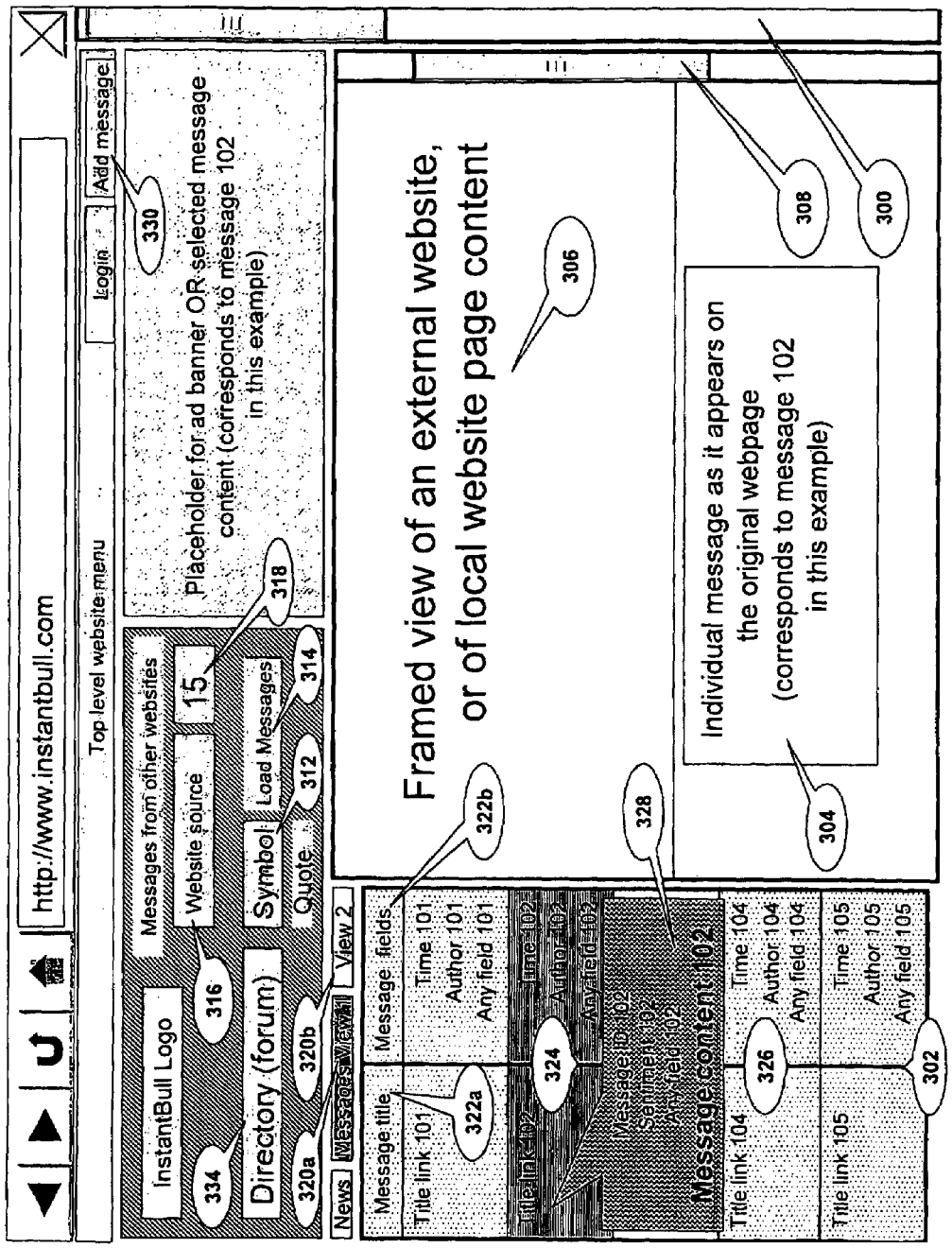
FIG. 3 is a window displayed by the message board aggregation system of FIG. 1 according to one embodiment of the present invention.

Referring to FIG. 1, a dataflow diagram is shown of a message board aggregation system 100 according to one embodiment of the present invention. Referring to FIG. 2, a flowchart is shown of a method 200 performed by the system 100 of FIG. 1 according to one embodiment of the present invention. Referring to FIG. 3, a window 300 displayed by the message board aggregation system 100 of FIG. 1 is illustrated according to one embodiment of the present invention.

In general, the window 300 shown in FIG. 3 contemporaneously displays a table 302 containing message table content (e.g., message title, message author, message ID, message sentiment, message time of writing, message web page source, person being replied to) and message content 304 corresponding to a message represented by one of the entries in the message table 302. In the embodiment illustrated in FIG. 3, the message content 304 is displayed in a web page 306 from a message board web site to which the message content 304 was originally posted. In the embodiment illustrated in FIG. 3, the source web page 306 (containing the message content 304) is displayed in a first frame 308 of the web page 300, and the message table 302 is displayed in a second frame 310 of the web page 300.

The web page 306 is an example of a "source" web page as that term is used herein. The message table 302 may include summaries of messages originally posted to more than one source web page. The web page 300, therefore, provides an aggregation service which aggregates messages from a plurality of web-based message boards. The web page 300, therefore, is referred to herein as an "aggregation" web page.

Having described certain general features of particular embodiments of the present invention, techniques that may be used to implement embodiments of the present invention will now be disclosed. Referring to FIG. 1, multiple external message boards 102a-m are illustrated. For ease of illustration and explanation, each of the message boards 102a-m is illustrated simply as a set of messages. More specifically, message board 102a includes a set of messages 104a, including messages 106a-n; message board 102b includes a set of messages 104b, including messages 108a-n; and message board 102m includes a set of messages 104m, including messages 110a-n. In practice, the message boards 102a-m may be implemented using web servers or any other appropriate kind of technology.

Furthermore, although only three external message boards 102a, 102b, and 102m are shown in FIG. 1 for purposes of example, the system 100 may include and/or access any number of external message boards, as indicated by the variable m. Furthermore, the term "message board" is not limited to any-particular kind of communications mechanism, and includes not only web-based message boards, but also newsgroups and email. Although each of the message boards 102a-m is shown in FIG. 1 as including the same number of messages n, the number of messages may vary among the message boards 102a-m.

A single message board, such as a web-based financial message board, may include a plurality of topics, each of which may include a plurality of threads or sub-topics. For ease of illustration and explanation, each of the message boards 102a-m is illustrated in FIG. 1 as containing only a single thread of messages. This does not represent a limitation of the present invention. Rather, the techniques disclosed herein may be applied to message boards including any number of topics, threads, or other groupings of messages.

The aggregation system 100 also includes a message board aggregation server 112 and a corresponding message board 114 (which includes set 116 of messages 118a-n). The message board 114 is managed by the aggregation server 112 or by the same entity that manages the aggregation server. Therefore, the message board 114 will be referred to herein as an "internal" message board, while the message boards 102a-m will be referred to herein as "external" message boards in relation to the aggregation server 112. As will be described in more detail below, the aggregation server 112 aggregates messages from two or more of the message boards 102a-m and 114, and displays content from the aggregated messages in the web page 300.

Referring again to FIG. 2, the system 100 of FIG. 1 may perform the method 200 to aggregate content from the message boards 102a-m and 114 to display aggregated message content in the window 300. A user 142 uses a web browser 140 to browse over the Internet 138 to a web site served by the aggregation server 112. The web page 300 is an example of a web page that may be part of such a web site. Upon visiting the web site, the user 142 selects one or more source message boards from which to view message content and summaries (step 202). The user 142 may, for example, make this selection by selecting the name of an external message board (such as one of the external message boards 102a-m) from a selection of sources accessible in any of a variety of formats, one example of which is a drop-down list 316. Note, however, that the user 142 may select more than one source message board.

In the particular example illustrated in FIG. 3, the web page 300 combines content extracted from the single external message board indicated by the selection in the drop-down list 316 with content extracted from the internal message board 114 associated with the aggregation server 112. Furthermore, in the example illustrated in FIG. 3, the user 142 may use drop-down list 318 to select the number of message summaries to be displayed in message table 302.

The user 142 selects other input parameters (such as the number of messages to be retrieved) (step 203). As described in more detail below, the aggregation server 112 may store the other input parameters in a set of other preferences 126.

The user 142 selects a particular message board topic to view (step 204). The user 142 may, for example, make this selection by identifying a particular company, such as by typing the company's name or stock ticker symbol in text field 312 and clicking button 314. This is only one of many ways in which the user may select a message board topic to view.

Furthermore, in the embodiment illustrated in FIG. 3, the web page 300 also includes a directory (forum) 334 user interface control which may, for example, take the form of a drop-down list. For example, the directory control 334 may allow the user to select either a "stock" forum or a "sports" forum. If the user 142 selects the "stock" forum, then the web page 300 may enable selection of stock symbols in text field 312, while if the user 142 selects the "sports" forum, then the web page 300 may enable selection of sports symbols in text field 312. More generally, the user's selection in the directory control 334 dictates which group of symbols is available for selection in the text input field 312. The use of the directory control 334 is provided merely for purposes of example and does not constitute a limitation of the present invention.

The user's message board selection is transmitted by the web browser 140 over the Internet 138 to the message board aggregation server 112. In response to receiving the user's selection, the aggregation server 112 retrieves information derived from messages in the selected source message board (s) having the selected topic (step 206). In the embodiment illustrated in FIG. 3, the aggregation server 112 also retrieves message content from the internal message board 114. This is not, however, a requirement of the present invention. The internal message board 114 may, for example, be selectable or de-selectable as a source by the user 142 in the same manner as the external message boards 102a-m.

Note further that any subset of the external message boards 102a-m may be selectable as a source by the user 142. Such a subset may, for example, consist of all of the external message boards 102a-m, any one of the message boards 102a-m, or any combination of fewer than all of the message boards 102a-m.

The information extracted from the selected source message board(s) by the aggregation server may include any of a variety of information that may be of interest to the user 142. Examples of information that may be extracted from each on-topic message in the selected message board(s) includes, but is not limited to the message title, author, ID, sentiment, time of writing, web page source, person being replied to, and message statistics (e.g., the number of times others have recommended the message, or a rating of the popularity of the message).

At any time during performance of the method 200 illustrated in FIG. 2, the user 142 may select one or more fields to be displayed in the message table 302 (step 208). For example, in the embodiment illustrated in FIG. 3, the message table includes a column 322a labeled "Message Titles," which always displays the titles of the messages summarized in the table 302. The table 302 also includes, however, a second column 322b having content that may-be varied by the user 142. More specifically, the user 142 may select link 320a to cause the column 322b to display the authors of the messages being summarized in the table 302 (as illustrated in FIG. 3). Similarly, the user 142 may select link 320b to cause the column 322b to display the times at which the messages being summarized in the table 302 were posted.

The particular selection of fields allowed in the embodiment illustrated in FIG. 3 is merely an example and does not constitute a limitation of the present invention. Rather, the user 142 may be allowed to select any combination of message fields for display in the table 302. Other examples of two fields from which the user 142 may select include, but are not limited to: message Title and Author fields; message Title and Time Submitted fields; and message Author and Author Attribute fields. Furthermore, a single column in the table 302 may display content from more than one field. For example, a single "time and author" column may simultaneously display both message time and author.

At any time during performance of the method 200 illustrated in FIG. 2, the user 142 may select an order in which message summaries are to be sorted in the message table 302 (step 210). For example, in the embodiment illustrated in FIG. 3, the user 142 may select the heading of column 322a to cause the contents of the table 302 to be sorted by message title, or select the heading of column 322b to cause the contents of the table 302 to be sorted by the contents of column 322b (e.g., message author or posting time). Alternatively, for example, the contents of the table 302 may be sorted automatically by posting time. Once again, these particular sorting options are merely examples and do not constitute limitations of the present invention.

The aggregation server 112 keeps track of: (1) the source message board(s) selected by the user 142 in source selections 1-20; (2) the topic (e.g., company) selected by the user 142 in topic selection 121; (3) the field(s) selected by the user 142 in field selections 122; (4) the sort order 124 selected by the user 142 in sort order 124; and (5) any other preferences 126 specified by the user 142.

The aggregation server 112 includes an aggregation engine 128, which generates message content units 132 based on the information extracted in step 206 and the user preferences described above (step 212). For example, the message content units 132 may include a content unit for each message that matches the topic selection 121 (e.g., company) in any of the source message board(s) indicated by the source selection(s) 120. Each of the message content units 132 may include information only for the fields specified by the field selections 122, but this is not required. The message content units 132 may, for example, include extracted information for fields other than those specified by the field selections. The message content units 132 may include all of the information that was extracted in step 206.

As will be described in more detail below, the information in the message content units 132 forms the basis for the information displayed in the message table 302 on the web page 300 (FIG. 3). In the embodiment illustrated in FIG. 3, the frame 308 displays a web page 308 corresponding to one of the message summaries displayed in the message table 302. When the web page 300 is first displayed, the message content corresponding to the first message summary in the table 302 may be displayed by default in the frame 308. Thereafter, the user 142 may select any of the message summaries in the table 302, such as by clicking on the title of the message in column 322a, to cause message content for a different message to be displayed-in the frame 308.

The aggregation engine 128, therefore, provides message content 130 corresponding to the currently-selected message summary in the message table 302 (step 214). The aggregation engine 128 may, for example, provide the content 130 in the form of HTML and/or other web content by copying the content 130 from its source message board (e.g., one of the external message boards 102a-m or the internal message board 114). The content 130 may either be copied to a storage medium local to the aggregation server 112, or merely passed as a reference to the client web browser 140, which may retrieve the message content 130 directly from its source and display it in the frame 308, without using the aggregation server 112 to serve the content 130 to the user 142.

The aggregation server 112 includes a web page generator 134, which produces an aggregated web page 136 (including HTML and/or other web content) that includes both the message content units 132 and the message content 130 (or a link to the message content 130) (step 216). The aggregated web page 136 may, for example, include a first frame for displaying a table including information from the message content units 132, and a second frame for displaying the message content 130.

The aggregation server 112 transmits the aggregated web page 136 to the web browser 140 over the Internet (step 218). The web browser 140 displays a window (such as the window 300 shown in FIG. 3) including: (1) web content (such as the web page 306) representing a first message posted to a first online forum, such as the external message board 102a; and (2) a plurality of message summaries (such as are displayed in the table 302) including information derived from the first message (such as the message summary 324 of the message 304) and second information derived from a second message in the plurality of messages (such as the message summary 326 of another message not displayed in the window 300). The web content and the message summaries may be displayed in different frames in the same window.

As described above, the message content units 132 that are downloaded by the web browser 140 to the local machine of the user 142 may include more information than is displayed in the table 302. The table 302 may, for example, be designed to display only the information that is considered most important to the user 142, such as the title, author, and/or timestamp of the aggregated messages. The user 142 may, however, read a particular one of the message summaries in the table 302 and desire to obtain additional information about the corresponding message. Although the user 142 could obtain such additional information by clicking on the message summary, thereby causing the corresponding message web content to be displayed in the frame 308, this requires the web browser 140 to download and render additional web content. Acquiring additional information about many messages in this way may therefore be tedious and time-consuming.

Alternatively, the web page 300 allows the user 142 to quickly obtain additional summary information about any message listed in the table 302 by, for example, moving and holding ("hovering") the mouse cursor over the message's summary. For example, in the case illustrated in FIG. 3, the user 142 has hovered the mouse cursor over message summary 324, thereby causing the web page 300 to display a tooltip 328 containing additional summary information about the source message 304. In the example illustrated in FIG. 3, the tooltip 328 includes additional information such as the message ID, author, sentiment, date and time, and the beginning of the message text.

Because the additional summary information has been preloaded by the web browser 140 in the process of downloading the message content units 132 from the aggregation server 112, the web browser 140 may generate and display the tooltip essentially instantaneously, and without again accessing the server 112. This allows the user 142 to quickly browse such additional information for many messages listed in the table 302 quickly and easily, simply by moving the mouse cursor over the corresponding message summaries.

The aggregation of messages from multiple message boards at multiple URLs into a single rich web page, including content initially is hidden and that may be displayed essentially instantaneously by the web browser client 140 without the need to make an additional access to the server 112, is made convenient by the increasing availability of broadband connectivity to users. Such broadband connectivity increasingly is available not only through wired networks at home and in the workplace but also through wireless networks accessible using mobile computing devices. By making it feasible for the client web browser 140 to download content-rich web pages without causing the user 142 to incur a significant delay before the web page is displayed, broadband connections allow the web browser 140 to provide a degree of interactivity in web pages that approaches or even matches that previously available only in client-side applications.

Note that the use of a tooltip is provided merely as an example and does not constitute a limitation of the present invention. Rather, the additional summary information may be provided in other forms, such as in a static object (e.g., a text box) on the web page 300. Furthermore, the user 142 may cause the additional summary information to be displayed using actions other than hovering, such as clicking or pressing a hotkey.

The tooltip, or other graphical user interface element that is used to display additional summary information, may be variable in size. For example, the web page 300 may allow the user 142 to select from among three sizes: small, large, and very large. The very large size may be particularly useful for users who are visually impaired. Such a feature may make it possible for visually impaired users to benefit from the features of the web page 300, without requiring the design of the web page (e.g., the font size of text in the table) to change.

Furthermore, the web page 300 may be implemented such that selecting (e.g., hovering or clicking) one of the message summaries in the table 302 always causes the corresponding message to be displayed in the frame 308, while the additional summary information (e.g., tooltip) is displayed. Although there may be some delay in loading and displaying the full message in the frame 308, the user 142 may view the additional summary information essentially immediately, thereby enabling the user 142 to decide quickly whether to wait for the remainder of the message to load or to move on to the next message summary.

The web page 300 may allow the user 142 to post additional messages to any-of the source message boards. For example, in the embodiment illustrated in FIG. 3, the web page 300 includes an "Add Message" button 330 that the user 142 may click to add a new message. When the user 142 clicks the button 330, a web page may be displayed which allows the user 142 to type a new message and submit it either to the internal message board 114 or to one of the external message boards 102a-m. In either case, once the user 142 has posted a new message, the message may be displayed in the frame 308, and a summary of the message may be displayed in the table 302.

Similarly, the web page 300 may include a "Reply Message" button (not shown in FIG. 3) that the user 142 may click to reply to the message currently being shown in the frame 308. When the user 142 submits a reply, the reply may be posted to the same message board as the message to which the user 142 has replied, whether that message board is external or internal to the aggregation server 112. Alternatively, the user 142 may be allowed to choose whether to reply from the internal message board 114 maintained by the aggregation server 112 or from the external message board currently displayed in the frame 308.

Message summaries in the message table 302 may be sorted in any manner. For example, the summaries may be sorted by time of posting by default. The user 142 may, however, sort these messages in other ways (e.g., by message title, message author, message ID, message sentiment, message web page source, person being replied to). If the message table 302 includes message summaries derived from multiple source message boards, the message table 302 may nonetheless display the summaries in an aggregated sorted list. For example, the summaries may be sorted by time of posting, in which case message summaries corresponding to messages from different source message boards may be interwoven with each other according to the times at which they were posted. This feature provides the user 142 with a unified view of messages across multiple message boards.

Among the advantages of the invention are one or more of the following. The features of the web page 300 illustrated in FIG. 3 provide an improvement in speed and ease of use when accessing message table content and corresponding message content, in comparison to conventional systems for performing such functions. In particular, the web page 300 both allows the user 142 to view a message summary and corresponding message content contemporaneously, and to quickly scan additional message summary information not contained in the table 302.

Furthermore, the techniques disclosed herein make it possible to read and write messages from and to multiple message board sources. Writing messages can be performed either from the web page 300, or at the original message board source in the frame 308. This saves the user 142 time in comparison to reading and writing multiple message boards using distinct web browser windows for each message board.

By providing features that are attractive and useful to frequent users of financial message boards, the techniques disclosed herein provide an opportunity to generate significant revenue from advertising. An example of a banner advertisement 332 for a financial services firm is shown on the web page 300 in FIG. 3. Note, however, that the web page 300 (and the web site of which it is a part) may generate revenue using any mechanism, not merely banner advertisements.

Furthermore, note that content other than an advertisement may occupy the space occupied by the advertisement 332 in FIG. 3. For example, the aggregation server 112 may display an advertisement for basic (i.e., non-paid) users, but display additional summary information (such as the information displayed by the tooltip 328 in FIG. 3) in a static object (such as a text box) in the same location as but instead of the advertisement 332 for premium (i.e., paid) users. The web page 300, in other words, may be designed to make efficient use of available screen "real estate" to tailor the content that is displayed in an attempt to maximize revenue.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In particular, the functions performed by the aggregation server 112 shown in FIG. 1 may be further subdivided into additional components for performing the same functions.

Although certain examples disclosed herein relate to financial message boards, the present invention is not limited to such examples. More generally, the techniques disclosed herein may be applied to any kind of messaging system, such as email and newsgroups, and to messaging systems containing messages whose content does not relate to finance. Furthermore, the techniques disclosed herein may be applied to aggregate content from web sites and other communications systems that are not designed as message boards. For example, the techniques disclosed herein may be used to aggregate news articles posted to news web sites, such as the web site for the New York Times (www.nytimes.com) or the Business Week (www.businessweek.com), even though such web sites are not designed as message boards to which members of the public may post messages. The term "message" as used herein, therefore, includes not only messages posted to message boards, but more generally to any unit of communication, such as an email message, a newsgroup posting, or a news article posted by an administrator to a news web site.

As described above, the aggregation server 112 extracts certain information from source message boards to produce the message content units 132. Examples of categories from which information may be derived include, but are not limited to: message title, message author, message identifier, message sentiment, message timestamp, message web address, message thread, message attribute (e.g., size), message link (links contained in the message), message keyword (keywords contained in the message), message recipient, and message statistics (e.g., the number of times others have recommended the message, or a rating of the popularity of the message). The user 142 may be allowed to sort the aggregated message summaries displayed in the message table 302 by, for example, any of the categories mentioned above.

Ease of visual cognition is key to a successful user interface. Various techniques may be combined with those described above to improve such ease of visual cognition. For example, message summaries in the table 302 may be color-coded or otherwise coded (such as by the use of distinct icons or words) according to their source or to any other attribute, such as according to any of the categories mentioned above. The table 302 may include any number of rows and columns. Columns may be assigned to message categories (attributes) in any way. For example, a single column may correspond to a single attribute or to multiple attributes. For example, in one embodiment, there are two columns: (1) title and (2) time and author.

The web browser 140 is not limited to any particular web browser application. The web browser 140 may, for example, be of any kind and operate on any kind of device (e.g., desktop computer, laptop computer, personal-digital assistant, or smart phone). Furthermore, although the network 138 in FIG. 1 is labeled as the "Internet," the web browser 140 and aggregation server 112 may communicate over any kind of network, such as a private intranet.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method, comprising:
   (1) displaying, in a window of a computer program, web content representing at least a portion of a first message, the first message comprising one of a plurality of messages posted to a first online forum; and
   (2) displaying, in the window of the computer program and contemporaneously with the web content, a plurality of message summaries, the plurality of message summaries comprising first information derived from the first message and second information derived from a second message, the second message comprising one of a plurality of messages posted to a second online forum that is different from the first online forum;
   wherein third information derived from a third message is displayed, in the window of the computer program and contemporaneously with the web content, the third message including an e-mail;
   wherein first additional information derived from the first message is preloaded and initially hidden, and later displayed in response to a first user interaction; and second additional information derived from the second message is preloaded and initially hidden, and later displayed in response to a second user interaction.

2. The method of claim 1, wherein (2) comprises:
   (2)(a) for each of the plurality of messages, deriving information from at least one of the following categories: message title, message author, message identifier, message sentiment, message timestamp, message web address, message thread, message attribute, message link, message keyword, person being replied to, and message statistics; and
   (2)(b) displaying the derived information.

3. The method of claim 2, further comprising:
   (3) receiving input from a user, the input indicating a category; and
   (4) displaying, contemporaneously with (1), information derived from the first message in the indicated category.

4. The method of claim 3, wherein (4) comprises replacing at least some of the information displayed in (2) with the information derived from the message in the indicated category.

5. The method of claim 2, wherein (2)(a) comprises deriving information from a plurality of the following categories: message title, message author, message identifier, message sentiment, message timestamp, message web address, message thread, message attribute, message link, message keyword, person being replied to, and message statistics.

6. The method of claim 1, further comprising:
   (3) receiving, from a user, input selecting one of the plurality of message summaries;
   (4) identifying a message in the plurality of messages corresponding to the selected message summary; and
   (5) displaying fourth information derived from the identified message.

7. The method of claim 6, wherein the identified message is the first message, and wherein the fourth information contains information not contained in the first information.

8. The method of claim 6, wherein (3) comprises receiving input indicating that the user has positioned a cursor over the selected one of the plurality of message summaries.

9. The method of claim 6, wherein (5) comprises displaying the fourth information using a tooltip.

10. The method of claim 6, wherein (5) comprises displaying the fourth information using a static user interface object.

11. The method of claim 6, wherein (5) comprises displaying the fourth information retrieved from a local source.

12. The method of claim 6, further comprising:
    (6) before (5), selecting a size selected from at least two sizes; and
    wherein (5) comprises displaying the fourth information at the selected size.

13. The method of claim 1, wherein (1) comprises displaying the web content in a first frame of the window, and wherein (2) comprises displaying the information derived from the first message in a second frame of the window distinct from the first frame.

14. The method of claim 1, wherein the first online forum comprises a web-based message board.

15. The method of claim 1, wherein (1) comprises:
    (1)(a) copying the web content from the first online forum; and
    (1)(b) displaying the copied web content in the window of the computer program.

16. The method of claim 1, wherein (1) comprises:
    (1)(a) identifying a link to the web content in the first online forum; and
    (1)(b) displaying the web content through the link.

17. The method of claim I wherein (2) comprises: (2)(a) receiving the first and second information from at least one remote source; (2)(b) storing the first and second information at a local source; and (2)(c) displaying the first and second information from the local source.

18. A computer-implemented method, comprising:
    (1) displaying, in a window of a computer program, web content representing at least a portion of a first message, the first message comprising one of a plurality of messages posted to a first online forum;
    (2) displaying, in the window of the computer program and contemporaneously with the web content, a message summary, the message summary comprising first information derived from the first message and second information derived from a second message, the second message comprising one of a plurality of messages posted to a second online forum that is different from the first online forum;

(3) receiving, from a user, input selecting the message summary; and (4) displaying third information derived from the first message, in response to receiving the user input;

wherein fourth information derived from a fourth message is displayed, in the window of the computer program and contemporaneously with the web content, the fourth message including an e-mail;

wherein first additional information derived from the first message is preloaded and initially hidden, and later displayed in response to a first user interaction; and second additional information derived from the second message is preloaded and initially hidden, and later displayed in response to a second user interaction.

19. The method of claim 18, wherein (2) comprises:

(2)(a) receiving the first information from at least one remote source;

(2)(b) storing the first information at a local source; and (2)(c) displaying the first information from the local source.

20. The method of claim 19, wherein the third information contains information not contained in the first information.

21. The method of claim 19, wherein (3) comprises receiving input indicating that the user has positioned a cursor over the message summary.

22. The method of claim 19, wherein (4) comprises displaying the third information using a tooltip.

23. The method of claim 19, wherein (4) comprises displaying the third information using a static user interface object.

24. The method of claim 19, wherein (4) comprises displaying third information retrieved from a local source.

25. The method of claim 18, wherein (1) comprises displaying the web content in a first frame of the window, and wherein (2) comprises displaying the message summary in a second frame of the window distinct from the first frame.

26. The method of claim 18, wherein the first online forum comprises a web-based message board.

27. A computer-implemented method, comprising:

(1) receiving, over a network, first information comprising a plurality of message data units, wherein each of the plurality of message data units contains information derived from a corresponding one of a plurality of messages posted to an online forum;

(2) displaying, in a first frame of a window of a computer program, web content representing at least a Portion of a first one of the plurality of messages; and (3) displaying, in a second frame of the window distinct from the first frame and contemporaneously with the web content, a plurality of message summaries corresponding to the plurality of messages and a second plurality of messages, wherein each of the plurality of message summaries consists of a subset of information in a corresponding one of the plurality of message data units and a second subset of information in a corresponding one of a second plurality of message data units, the second plurality of message data units contains information derived from a corresponding one of the second plurality of messages posted to a second online forum that is different from the online forum;

wherein third information derived from a third message is displayed, in the window of the computer program and contemporaneously with the web content, the third message including an e-mail;

wherein the subset of information in the corresponding one of the plurality of message data units is preloaded and initially hidden, and later displayed in response to a first user interaction; and the second subset of information in the corresponding one of the second plurality of message data units is preloaded and initially hidden, and later displayed in response to a second user interaction.

28. The method of claim 27, further comprising:

(4) receiving, from a user, input selecting one of the plurality of message summaries;

(5) identifying a message in the plurality of messages corresponding to the selected message summary;

(6) identifying a message data unit corresponding to the message identified in (5); and (7) displaying information in the identified message data unit that is not in the selected one of the plurality of message summaries.

29. A computer program product embodied on a tangible computer readable medium, comprising:

computer code for displaying, in a window of a computer program, content representing at least a portion of a first message, the first message comprising one of a plurality of messages posted to a first online forum; and computer code for displaying, in the window of the computer program and contemporaneously with the content, a plurality of message summaries, the plurality of message summaries comprising first information derived from the first message and second information derived from a second message, the second message comprising one of a plurality of messages posted to a second online forum that is different from the first online forum;

wherein third information derived from a third message is displayed, in the window of the computer program and contemporaneously with the content, the third message including an e-mail;

wherein first additional information derived from the first message is preloaded and initially hidden, and later displayed in response to a first user interaction; and second additional information derived from the second message is preloaded and initially hidden, and later displayed in response to a second user interaction.

30. The computer program product of claim 29, wherein at least one field that is displayed with the message summaries is determined by a user selection.

31. The computer program product of claim 30, wherein the at least one field includes at least one of a message title field, a message author field, and a message time submitted field.

32. The computer program product of claim 29, wherein the first additional information and the second additional information each includes additional summary information.

33. The computer program product of claim 29, wherein the first message includes the first additional information.

34. The computer program product of claim 29, wherein the first additional information includes more information with respect to the first information.

35. The computer program product of claim 29, wherein the first additional information and the second additional information each includes a date and time.

36. The computer program product of claim 29, wherein the first additional information and the second additional information each includes a beginning of message text.

37. The computer program product of claim 29, wherein the first additional information and the second additional information are displayed utilizing a tooltip.

38. The computer program product of claim 29, wherein the first additional information and the second additional information are displayed utilizing a static object.

39. The computer program product of claim 29, wherein the first additional information and the second additional information are displayed without accessing a server.

40. The computer program product of claim 29, wherein the first additional information and the second additional information are displayed utilizing a graphical user interface element of variable size that is determined by a user.

41. The computer program product of claim 29, wherein the third information derived from the third message is displayed utilizing a graphical user interface element of variable size that is determined by a user.

42. The computer program product of claim 29, wherein the content is displayed utilizing a graphical user interface element of variable size that is determined by a user.

43. The computer program product of claim 29, wherein the first user interaction and the second user interaction each includes hovering a cursor.

44. The computer program product of claim 29, wherein the first user interaction and the second user interaction each includes clicking.

45. The computer program product of claim 29, wherein the first user interaction and the second user interaction each includes interactions with one of the message summaries.

46. The computer program product of claim 29, wherein the displaying the content and the displaying the plurality of message summaries are carried out utilizing a website, and the third message is capable of being accessed utilizing the website.

47. The computer program product of claim 29, wherein the displaying the content and the displaying the plurality of message summaries are carried out utilizing a website, and the first message and the second message are capable of being accessed utilizing the website.

48. The computer program product of claim 29, wherein the displaying the content and the displaying the plurality of message summaries are carried Out utilizing a website, and a new message is capable of being generated by a user utilizing the website.

49. The computer program product of claim 29, wherein the displaying the content and the displaying the plurality of message summaries are carried out utilizing a website, and a new posting is capable of being generated by a user utilizing the website.

50. The computer program product of claim 29, wherein the displaying the content and the displaying the plurality of message summaries are carried out utilizing a website, and a reply message is capable of being generated by a user utilizing the website.

51. The computer program product of claim 29, wherein the first message and the second message are interwoven.

52. The computer program product of claim 29, wherein the first online forum includes at least one of a message board and a newsgroup.

53. The computer program product of claim 29, wherein the first online forum is associated with an internal message board, and the second online forum is associated with an external message board.

54. The computer program product of claim 29, wherein the first online forum and the second online forum are chosen by a user.

55. The computer program product of claim 29, wherein the first online forum and the second online forum are chosen by a user, by visiting a web site served by an aggregation server that executes the computer code.

56. The computer program product of claim 29, wherein a user is allowed to control a number of the message summaries that are displayed.

57. The computer program product of claim 29, wherein a user is allowed to control a number of the message summaries that are displayed via a drop-down list.

58. The computer program product of claim 29, wherein a user is allowed to control a number of the message summaries that are displayed by selecting the number.

59. The computer program product of claim 29, wherein a user is allowed to control the manner in which the message summaries are displayed utilizing a message time submitted field.

60. The computer program product of claim 29, wherein a user is allowed to enter a key term for controlling content of at least one of the first message and the second. message.

61. The computer program product of claim 29, wherein a user is allowed to select any of the message summaries, such that selecting one of the message summaries causes message content for a different message to be displayed.

62. The computer program product of claim 29, wherein the first message and the second message are capable of being accessed via a single browser window.

63. The computer program product of claim 29, wherein revenue is generated utilizing advertisements.

64. An apparatus comprising:
first means for causing to be displayed, in a window of a computer program, web content representing at least a portion of a first message, the first message comprising one of a plurality of messages posted to a first online forum; and
second means for causing to be displayed, in the window of the computer program and contemporaneously with the web content, a plurality of message summaries, the plurality of message summaries comprising first information derived from the first message and second information derived from a second message, the second message comprising one of a plurality of messages posted to a second online forum that is different from the first online forum;
wherein third information derived from a third message is displayed, in the window of the computer program and contemporaneously with the web content, the third message including an e-mail;
wherein first additional information derived from the first message is preloaded and initially hidden, and later displayed in response to a first user interaction; and second additional information derived from the second message is preloaded and initially hidden, and later displayed in response to a second user interaction.

65. An apparatus comprising:
means for receiving, over a network, first information comprising a plurality of message data units, wherein each of the plurality of message data units contains information derived from a corresponding one of a plurality of messages posted to an online forum;
first means for displaying, in a first frame of a window of a computer program, web content representing at least a portion of a first one of the plurality of messages; and
second means for displaying, in a second frame of the window distinct from the first frame and contemporaneously with the web content, a plurality of message summaries corresponding to the plurality of messages and a second plurality of messages, wherein each of the plurality of message summaries consists of a subset of information in a corresponding one of the plurality of message data units and a second subset of information in a corresponding one of a second plurality of message data units, the second plurality of message data units contains information derived from a corresponding one of the second plurality of messages posted to a second online forum that is different from the online forum;

wherein third information derived from a third message is displayed, in the window of the computer program and contemporaneously with the web content, the third message including an e-mail;

wherein the subset of information in the corresponding one of the plurality of message data units is preloaded and initially hidden, and later displayed in response to a first user interaction; and the second subset of information in the corresponding one of the second plurality of message data units is preloaded and initially hidden, and later displayed in response to a second user interaction.

66. An apparatus, comprising:

first means for displaying, in a window of a computer program, web content representing at least a portion of a first message, the first message comprising one of a plurality of messages posted to a first online forum;

second means for displaying, in the window of the computer program and contemporaneously with the web content, a message summary, the message summary comprising first information derived from the first message;

means for receiving, from a user, input selecting the message summary; and third means for displaying third information derived from the first message, in response to receiving the user input, the second message comprising one of a plurality of messages posted to a second online forum that is different from the first online forum;

wherein third information derived from a third message is displayed, in the window of the computer program and contemporaneously with the web content, the third message including an e-mail;

wherein first additional information derived from the first message is preloaded and initially hidden, and later displayed in response to a first user interaction; and second additional information derived from the second message is preloaded and initially hidden, and later displayed in response to a second user interaction.

* * * * *